United States Patent

[11] 3,593,254

| [72] | Inventors | William E. Glenn, Jr.;<br>Frank B. Gorman, both of Stamford, Conn. |
|---|---|---|
| [21] | Appl. No. | 794,564 |
| [22] | Filed | Jan. 28, 1969 |
| [45] | Patented | July 13, 1971 |
| [73] | Assignee | Columbia Broadcasting System, Inc.<br>New York, N.Y. |

[54] SONOGRAPHY SYSTEM
7 Claims, 1 Drawing Fig.

[52] U.S. Cl. ................................................. 340/3,
340/5, 181/0.5
[51] Int. Cl. ................................................. G01s 9/66
[50] Field of Search ........................................ 340/1, 3, 5;
73/67—67.8; 181/0.5

[56] References Cited
UNITED STATES PATENTS
3,461,420  8/1969  Silverman ................. 340/3 X
3,467,216  9/1969  Massey ..................... 181/0.5

*Primary Examiner*—Richard A. Farley
*Attorney*—Brumbaugh, Graves, Donohue and Raymond ABSTRACT: As described herein, the output signals generated by a plurality of hydrophones arranged in a generally rectangular array are scanned line-by-line by a signal having a selected frequency. The scanned signals are then combined with a reference signal which is generated by a centrally disposed hydrophone and which is selectively phased with respect to each of the scanned output signals. The selective phase relationship between the reference signal and each of the other scanned signals is maintained by appropriately shifting the phase of the reference signal at a frequency corresponding to the frequency of the line scanning frequency. The combined signals are thereafter recorded in a line-by-line pattern on thermoplastic film.

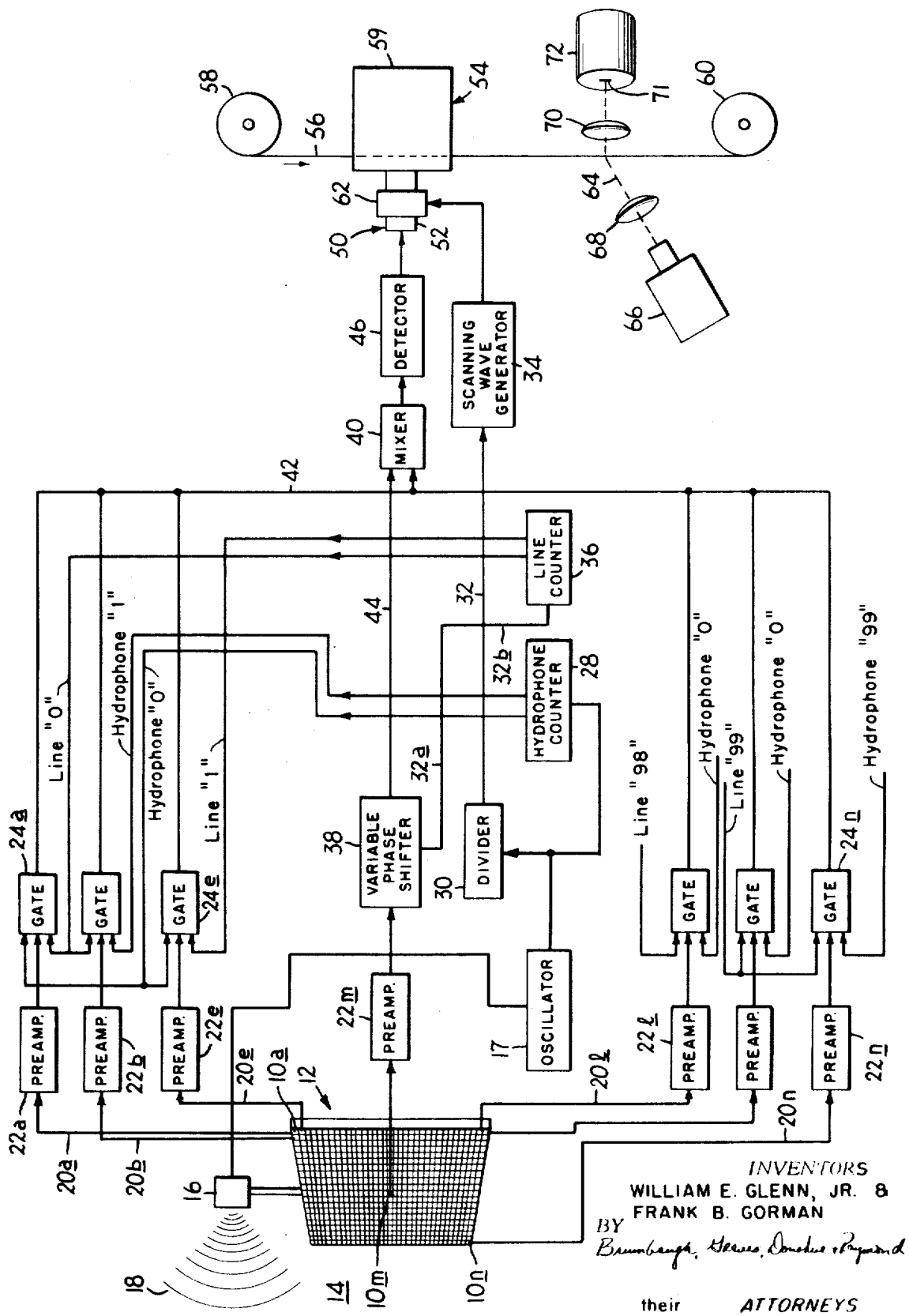

3,593,254

SONOGRAPHY SYSTEM

BACKGROUND OF THE INVENTION

This invention relates to holography for vision by acoustic waves and, more particularly, to sonography systems employing holographic techniques to obtain a visual reproduction of an object field scanned by acoustic waves.

In light optical holography, a beam of coherent light generated by a suitable source which may be, for example, a laser, is split into two beams. One beam is reflected from an object and therefore carries a three-dimensional image of the object and the other beam, which is called the "reference" beam, is unaltered. When the image-carrying beam and the reference beam converge on a photographic plate, countless interference patterns are generated on a surface of the plate to produce thereby a hologram. As is understood, the image carrying beam and the reference beam must be temporally coherent to a fraction of a wavelength when the two beams converge on the photographic plate.

To display the original three-dimensional image, the photographic plate is developed and thereafter a beam of coherent light is directed onto the developed photographic plate from the direction of the original reference beam. The interference pattern on the plate alters the waves so that the waves emerge with all the directional and brightness characteristics of the original image-carrying beam.

From an understanding of the operation of light optical holography, it can be realized that in sonography it is necessary to produce a sonogram which is the sound equivalent of the photographic plate. More particularly, an acoustic transmitter is necessary to scan the object and a fixed or movable two-dimensional array of sound intensity receptors must be employed to detect an information carrying sound wave reflected from the object. This sound wave must then be combined with a reference wave to produce a joint intensity wave. It is noteworthy that the number of sound intensity receptors should provide enough information to produce a picture of complicated objects and that the reference waves should fall at some angle outside the field of vision and be temporally coherent with the information carrying sound waves when combined therewith. If, then, the joint intensity wave is recorded on a storage medium in an array corresponding to the original sound intensity array, the visible equivalent of the information carrying sound wave can be reproduced by directing a beam of coherent light corresponding to the reference wave onto the photographic plate.

SUMMARY OF THE INVENTION

Accordingly, it is an object of the invention to provide a new and improved sonography system for recording joint intensity waves on a storage medium in an array corresponding to the sound intensity array.

This and other objects of the present invention are accomplished by scanning the output signals produced by a generally matrixlike array of sound intensity receptors with a scanning signal and thereafter mixing each of the scanned signals with a reference signal developed by a selected one of the sound intensity receptors and selectively phased with respect to each of the sampled signals. Thereafter, the mixed signals are recorded on a storage medium in a pattern corresponding to the array of sound intensity receptors.

BRIEF DESCRIPTION OF THE DRAWING

In the drawing:

The single FIGURE is a schematic block diagram of one embodiment of an illustrative sonography system arranged according to the present invention.

DESCRIPTION OF THE PREFERRED EMBODIMENT

In a representative sonography system arranged according to the present invention, as shown in the single FIGURE, a plurality of sound intensity receptors $10a-10n$ which may be for example hydrophones, are arranged in a generally matrixlike array 12 and are disposed such that each hydrophone faces an object field 14. Depending upon the application of the present invention, the hydrophones $10a-10n$ may be secured for example to the forward end of a submerged vessel, such as a bathysphere. As is understood, hydrophones are responsive to acoustic waves and develop signals corresponding to the intensity of the acoustic waves. A typical hydrophone which may be employed in the instant invention is disclosed in a patent application entitled "Sonar System Employing Holographic Techniques To Produce A Picture Of An Object Field," Ser. No. 664,415, filed Aug. 30, 1967, and assigned to the assignee of the present invention.

Generally, the hydrophone disclosed in the above-mentioned patent application includes a cylindrical piezoelectric crystal and a pair of cylindrical steel contacts affixed to opposite ends of the crystal. The upper steel contact is also secured to a rubber sheet which is matched to the wave transmitting medium, such as, for example, water. The crystal and steel contacts are encapsulated by a cartridge and are suspended in foam rubber which has a negligible wave impedance.

Displaced from the hydrophones $10a-10n$ and movable therewith is an illuminating transducer 16. The transducer 16 is driven by a stable oscillator 17 and emits an acoustic wave beam 18 which illuminates the object field 14. In the preferred embodiment discussed herein, the acoustic wave beam 18 has a relatively short scanning range, such as, 300 feet and the frequency of the wave beam 18 ranges from 300 to 500 kiloHertz.

All the hydrophones in the array 12 are responsive to the waves reflected from all the points in the object field 14. To obtain a visual reproduction of a complicated object field, a minimum of 10,000 image points is required. Accordingly, to satisfy this minimum requirement, the array 12 should comprise a hydrophone matrix consisting of 10,000 hydrophones which may be arranged, for example, in a 100×100 matrix. If 20,000 hydrophones were provided, the array 12 may comprise, for example, a matrix consisting of 100 rows and 200 columns of hydrophones or vice versa.

The acoustic wave beam 18 emitted by the transducer 16 illuminates the object field 14 and the waves reflected by all points in the illuminated field 14 are sensed by the hydrophones $10a-10n$. The voltage signals developed by the hydrophones $10a-10n$, and corresponding to the intensity of the reflected waves, are coupled through a plurality of conductors $20a-20n$, respectively, to a corresponding number of preamplifiers $22a-22n$, respectively. After amplification, except for the voltage signal produced by the preamplifier $22m$, the voltage signals are supplied to the first input terminals of a plurality of gate circuits $24a-24n$, respectively. The gate circuits $24a-24n$, which may be, for example, AND gates comprising as many as nine input terminals, transmit the amplified voltage signals when signals of proper phase and amplitude are supplied to the remaining input terminals thereof. As will be described hereinbelow, the gate circuits $24a-24n$ are selectively and sequentially enabled by a scanning arrangement which generates line and hydrophone scanning signals.

As mentioned above, the oscillator 17, operating at a frequency of 300 kiloHz. or greater for short scanning ranges, drives the illuminating transducer 16 which emits the acoustic beam 18. In addition, the signals generated by the oscillator 17 are supplied to the input terminal of a hydrophone counter 28 which may be, for example, a binary counter and to a divider circuit 30, which may be, for example, a shift register. The divider circuit 30 decreases the frequency of the signal generated by the multiplier 26 by a selected factor. In the above example, the frequency of the signals developed by the oscillator 17 may be scaled down by a factor of 100. The scaled down or "line" signals are then supplied via a conductor 32 and its branch conductors $32b$ and $32a$ to the input terminals of a scanning wave generator 34, a line counter 36 and a variable phase shifter network 38 respectively.

In response to the signals supplied to it from the oscillator 17, the counter 28 accumulates a count of 100 before resetting. As is understood, to accumulate a count of 100 (0—99), the counter requires only seven bistable devices. To decode the count in the counter 28 as it is being accumulated, a decoding network may be provided or, as shown, the appropriate stages of the counter 28 may be coupled selectively to the gate circuits 24a—24n. Specifically, to enable the AND gate 24a, which is enabled when the counter has a zero count, it is necessary to couple all seven stages of the counter to the gate 24a. Relative to the gate circuit which is enabled when a count of 64 is accumulated in the counter, it is also necessary that all the stages be coupled to that particular gate circuit. For the sake of clarity only one conductor is shown leading from the counter 28 to each of the gate circuits, each conductor being labeled hydrophone "0," hydrophone "1"—hydrophone "99." The input terminals of the gate circuits corresponding to the hydrophones arranged in the same columns of the matrix are connected together. For example, the appropriate input terminals of the gate circuits which are coupled to the hydrophones situated in column O of the array 12 are coupled together. For the sake of clarity only the input terminals of the gate circuits 24a (Row 0, Column 0) and 24e (Row 1, Column 0) are shown connected together. Both AND gates are partially enabled when the counter 28 has a 0 count therein.

As above mentioned, the divider circuit 30 supplies line signals to the line counter 36. In response to these signals, the counter 36 accumulates a count which is employed to enable selectively the gate circuits corresponding to the rows of hydrophones in the array 12. Again, a decoding network may be provided to decode the count (0—90) of the counter or each stage of the counter may be selectively connected to the gate circuits 24a—24n in order to decode the count. For this configuration, the input terminals of the gate circuits corresponding to the hydrophones arranged in each row of the array 12 would be connected together. For the sake of clarity, only one conductor is shown leading from the counter 36 to each of the gate circuits 24a—24n and the conductors are labeled Line "0"—Line "99," respectively.

The voltage signals produced by a centrally located hydrophone which may be, for example, hydrophone 10m and amplified by the preamplifier 22m, are supplied to a variable phase shifter 38 which may be of conventional construction and, accordingly, without external control, operates to change the phase of the developed signals by a selected amount, such as, for example, 30°. The phase shifted signals developed by the hydrophone 10m are employed as reference signals to simulate the angular impingement upon the hydrophones of a reference acoustic wave. This simulated reference acoustic wave corresponds to the reference wave employed in light optical holography, as will be more apparent hereinbelow.

Because of the line scanning method employed in the present invention, there results a phase shift or difference in phase between the signals scanned in each of the hydrophone rows of the array 12. Accordingly, to maintain the same phase difference (e.g. 30°) between the signals developed by the hydrophones 10a—10n and the reference signal developed by the hydrophone 10m, the phase shifter 38 is caused to advance or retard the phase of the reference signal at a frequency which corresponds to the line scanning rate. Specifically, the divider circuit 30 supplies the line pulses through the conductor 32a to the variable phase shifter 38 at the start of each line or hydrophone row scan to cause the phase shifter 38 to advance or retard the phase of the reference signal by an appropriate amount, such as, for example, 30°±306°.

The output terminals of the gate circuits 14a—24n are coupled together and to the input terminal of a mixer circuit 40 by a conductor 42. A conductor 44 couples the output terminal of the variable phase shifter 38 to the other input terminal of the mixer circuit 40. In the mixer circuit 40, which may be of conventional construction, the voltage signals developed by the hydrophones 10a—10n, excluding hydrophone 10m, and sequentially transmitted each scanning cycle through the gate circuits 24a—24n are combined with the phased reference signals produced by the variable phase shifter 38. An output signal is then produced by the mixer circuit 40 which is proportional to the joint intensity of the reflected object acoustic wave and the simulated reference acoustic wave. In other words, a signal is produced which is proportional to the square of the sum of the amplitudes of the phased reference signal and the amplitude of the signal produced by the associated hydrophone. In this manner, the interference patterns generated on a photographic plate by converging reference and image-carrying beams in light holography is simulated.

From the mixer circuit 40, the joint intensity signals are supplied to a detector 46 which develops a DC control signal which is proportional to the magnitude of the joint intensity signals. Thereafter, the control signal is supplied to recording apparatus for recording the signals in a pattern corresponding to the array 12 on thermoplastic film. For typical recording apparatus which may be used in the instant invention, reference may be had to U.S. Pat. No. 3,113,179, entitled "Method and Apparatus for Recording," issued in the name of W. E. Glenn, Jr., coapplicant in the matter of the present patent application. Generally, the apparatus includes a chamber 50 which is substantially evacuated of gases and vapors and which includes an electron beam assembly 52. An electron beam is generated, focused and deflected in the assembly 52. Also provided is a film assembly 54 in which a thermoplastic film 56 passes from a supply reel 58 through a chamber 59 and to a takeup reel 60. In the chamber 59, the thermoplastic film is first heated, then subjected to the electron beam from the assembly 52 and thereafter cooled.

In the electron beam assembly 52, the cathode electrode may be heated by a filament and the anode electrode (not shown) provided with a small centrally located rectangular hole, may function to accelerate and modulate the electron beam in typical control electrode fashion. Consequently, the detected input signals can be impressed upon the beam by applying them to the anode electrode. Preferably, however, the detected input signals are supplied to a pair of auxiliary deflection electrodes (not shown) which, in conjunction with primary deflection structure described hereinafter, momentarily slow the speed and even halt the deflection of the beam. Thus, the beam will pause at points on the film for times that are functions of the amplitude of the detected input.

A solenoid coil 62 mounted on the assembly magnetically focuses the electron beam to converge on the thermoplastic film 56 in a small rectangular area. The operation of the electron beam forming assembly 52 is quite similar to the operation of like structure in a television receiver with the principal exception that the beam in the assembly 52 is scanned only over a line as contrasted to area scanning in a television tube. To this end, the deflection coil 62 is supplied with line deflection sawtooth waves generated by the scanning wave generator 34 in response to the line signals generated by the divider circuit 30. Area coverage is produced by the recording apparatus, however, because the film 56 is moved perpendicularly to the line of deflection.

As the thermoplastic film passes between the reels 58 and 60 and immediately following entry into the chamber 59, the thermoplastic coating of the film is heated in the chamber 59 to a liquid state by applied heat. Almost immediately after the film 56 is heated, the molten thermoplastic coating is impinged by the signal electron beam from the assembly 52, which beam is deflected widthwise over the film by a magnetic field from the deflection yoke 62. The number of electrons striking any point on the film depends upon the deflection speed and also upon the number of electrons in the beam. Since a high intensity beam is generally desired, the beam is usually modulated by the application of the detected input voltage to auxiliary deflection plates within the assembly 52. Therefore, the deflection speed of the beam across any point of the film is a function of the instantaneous magnitude of the input voltage and the number of electrons impinging any point on the film is a function of the same voltage.

The resulting electrons on the film surface are electrostatically attracted toward the film to produce minute depressions in the liquid surface, the depths of which depend upon the number of electrons at any one point. Thus, the depths of the depressions are a function of the amplitude of the input voltage applied to the deflection plates. In other words, the thermoplastic layer undergoes a pattern of thickness deformation which corresponds to the charge pattern on its surface. As will be described hereinbelow, these deformations are effective to refract or diffract light emanating from the surface of the thermoplastic film so that the recorded information may be read by an optical system. These depressions would be smoothed out and lost when the film 56 is rewound if it were not for the subsequent cooling of the liquid surface to a substantially solid state by cooling means within the chamber 54. After the film has been cooled, it passes from the box to the takeup reel 60.

It can be seen that each successive 100 lines of information recorded on the thermoplastic film 56 in the above-described manner constitutes a sonogram, a sonogram being the sound equivalent of a light hologram. The sonogram is recorded on the film 56 in a line-by-line pattern which corresponds to the hydrophone array 12, although, as can be appreciated, the sonogram is recorded at a greatly reduced scale with respect to the actual hydrophone array 12. To reconstruct the sonograms, the film 56 in its travel to the takeup reel 60, is illuminated by a laser beam 64 emitted by a laser 66 and focused onto the film by a lens 68. The beam 64 is focused by the lens 68 onto the film 56 at an angle which corresponds to the phase difference between the simulated reference acoustic wave and the signals developed by the hydrophones. Each sonogram can be viewed simultaneously by means of a lens 70 which implements the total reconstruction of the object field from the sonogram presented to it. The image appears at the focal point of the lens 70 and is imaged on the photocathode 71 of an image tube 72, the tube 72 providing on its screen a record image of the object field 14. If, desired, a Schlerin slit system of the type illustrated and described in the above-mentioned U. S. Pat. No. 3,113,179 may be included between laser 66 and the image tube 72.

In operation, the transducer 16 emits an acoustic wave beam 18 for illuminating the object field 14 and the hydrophones 10a—10n derive voltage signals which are proportional to the intensity of the sound waves reflected from all the objects in the illuminated object field 14. The derived voltage signals are amplified by the preamplifiers 22a—22n and thereafter supplied to the gate circuits 24a—24n. The gate circuits 24a—24n compose a decoding network which decodes the respective counts accumulated in the hydrophone counter 28 and the line counter 36 so as to implement the transmittal each full scanning cycle of the signals developed by the hydrophones 10a—10n sequentially and in a line-by-line pattern. The signal produced by the preamplifier 22m, to which the centrally situated hydrophone 10m is operatively coupled, supplies reference signals to the variable phase shifter 38 which shifts the phase of the reference signals by an appropriate amount and at a frequency corresponding to the line scanning frequency. The output signals developed by the phase shifter 38 correspond to reference acoustic wave beams having impinged angularly upon the hydrophones 10a—10n.

The sequentially transmitted hydrophone signals and the reference signals produced by the phase shifter 38 are combined in a mixer circuit 40 and thereafter supplied to a chamber 50 in which the electrons produced by the electron beam assembly 52 impinge upon a heated thermoplastic film 56 to produce minute depressions in the liquid surface thereof and record sonograms. The depths of the depressions depend upon the number of electrons focused onto any one point. After the sonograms are recorded, the film is cooled and then supplied to the takeup reel 60 through an optical reconstruction system which reconstructs the recorded sonograms.

Although the invention has been described herein with reference to a specific embodiment, many modifications and variations therein will readily occur to those skilled in the art. For example, for longer ranges, a scanning frequency of 20 kiloHertz may be utilized. In this instance, a multiplier would be included to increase the hydrophone scanning frequencies above the 20 kiloHertz scanning frequency. Each hydrophone would then be scanned for a fraction of a scanning cycle and, to compensate for this partial scanning, a mixer and detector circuit may be included between each hydrophone preamplifier and its associated gate circuit. Accordingly, all such variations and modifications are included within the intended scope of the invention as defined by the following claims.

We claim:

1. A sonography system comprising a plurality of sound intensity receptors arranged in a predetermined array and responsive to acoustic waves in an object field for developing signals corresponding to the intensities of the waves, means responsive to one of said signals for generating a reference signal selectively phased with respect to the other of said signals, means for sequentially scanning the other of said signals, means responsive to the scanned signals and to the reference signals for combining said signals to produce joint intensity signals and recording means, including a storage medium, for recording the joint intensity signals on the storage medium in a pattern corresponding to the array of sound intensity receptors.

2. A sonography system according to claim 1 further comprising acoustic wave transmitting means for scanning an object field with a scanning wave having a selected frequency and wherein the plurality of sound intensity receptors are arranged in a matrixlike array and are responsive to the acoustic waves reflected off objects in the scanned object for developing signals corresponding to the intensities of the reflected waves.

3. A sonography system according to claim 2 wherein the scanning means comprises a decoding network means including gate means operatively coupled to the sound intensity receptors and counter means for developing line scanning and sound intensity receptor scanning signals, the sound intensity receptor scanning signals having frequencies corresponding to the object field scanning wave frequency and supplying said signals to the decoding network means to sequentially enable the gate means.

4. A sonography system according to claim 3 wherein the reference signal generating means comprises variable phase shifter means responsive to the developed line scanning signals and to the one of said signals for supplying reference signals selectively phased with the signals sequentially transmitted by the gate means.

5. A sonography system according to claim 4 wherein the line scanning signals supplied to the variable phase shifter means causes the variable phase shifter means to vary the phase of the reference signal at a frequency corresponding to the frequency of the line scanning signals.

6. A sonography system according to claim 1 further comprising optical reconstruction means, the reconstruction means comprising means for directing a beam of coherent light onto the storage medium at an angle corresponding to the phase difference between the reference signals and the other of said signals to provide an image of the object field and light sensitive means responsive to the illuminated image for reproducing the image.

7. A sonography system according to claim 1 wherein the storage medium of the recording means comprises thermoplastic film and wherein the recording means comprises means for heating the thermoplastic film, electron beam assembly means responsive to the joint intensity signals for controlling the deflection of the electron beam produced by the assembly as it impinges the thermoplastic film, and means for cooling the film following the impingement thereon by the electron beam.